United States Patent Office 3,165,497
Patented Jan. 12, 1965

3,165,497
ACRYLOXYACETOPHENONE COPOLYMERS
Stanley Tocker, Wilmington, Del., assignor to E. I. du Pont de Nemours and Company, Wilmington, Del., a corporation of Delaware
No Drawing. Filed Feb. 29, 1960, Ser. No. 11,503
17 Claims. (Cl. 260—62)

This invention relates to organic polymeric structures and particularly to shaped articles such as polymeric films suitable for outdoor use.

Many organic polymeric structures, such as structures of polyethylene, polypropylene, and the like, i.e., polymers of aliphatic alpha-olefins, deteriorate rapidly when subjected to sunlight. The materials are sensitive to light in the ultraviolet range, particularly in the wave length range of 2900–3800 A. Exposure to ultraviolet light tends to embrittle the structures and reduce the level of their electrical and physical properties substantially. Some polymers acquire an undesirable color on exposure to ultraviolet light.

The use of certain chemical compounds as ultraviolet absorbers in mechanical mixture with the polymers is known. Thus, compounds such as benzophenones or salicylic esters have been incorporated in the molten polymer prior to forming a structure or they have been coated on the surface of the polymeric structures. In either case, the protetcion afforded by these compounds is not permanent. The compounds gradually disappear from the polymeric structure due to their volatility.

Also, while the known light stabilizers do provide some benefits in the stabilization of the polymeric structures, in general they do not stabilize sufficiently well throughout the broad range in which polymeric structures such as described above are sensitive to degradation by ultraviolet light.

The object of the present invention is to provide a substantially permanent weather-resistant organic polymeric shaped article, particularly film, suitable for prolonged outdoor use. It is a further object to provide a substantially permanent weather-resistant organic polymeric shaped article which is resistant to the degradation of ultraviolet light over a wide range of wave lengths. Other objects will appear hereinafter.

The objects are accomplished by a copolymer of 90–99.99 mole percent of at least one unsaturated aliphatic compound, compound A, having the structural formula:

wherein $R_1$ is selected from the group consisting of hydrogen and alkyl having 1–4 carbon atoms,
and .01–10 mole percent of at least one unsaturated compound, compound B, having the structural formula:

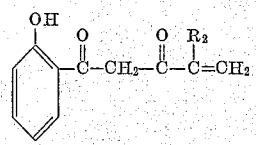

wherein $R_2$ is selected from the group consisting of hydrogen and alkyl having 1–3 carbon atoms and is preferably a methyl group,
the precise nature of the copolymer to be described subsequently.

Specifically, the objects are accomplished by a rearranged copolymer of 90–99.99 mole percent of at least one polymerizable compound selected from the group consisting of ethylene, propylene, butene-1, pentene-1 and hexene-1 and .01–10 mole percent of at least one ethylenically unsaturated compound selected from the group consisting of 2-acryloxybenzophenone, 2-methacryloxyacetophenone, 2-ethacryloxyacetophenone and 2-propylacryloxyacetophenone.

PREPARATION OF THE STABILIZING MONOMERS, THE ESTERS OF O-HYDROXYACETOPHENONE

Esters such as 2-acryloxyacetophenone and 2-methacryloxyacetophenone can be most conveniently prepared by reaction of the corresponding acid chloride on hydroxyacetophenone in the presence of a basic catalyst such as sodium hydroxide, potassium hydroxide or alkali metal alkoxides. The reactions proceed rapidly even at room temperature and the yields are generally high. The esterifications can also be accomplished by the use of acylating agents such as acrylic acid anhydride but these esterifications proceed more slowly at lower temperatures. At higher temperatures, acylations with the acid anhydrides proceed more rapidly but care must be taken to avoid premature rearrangement of the o-acyloxyacetophenone produced.

COPOLYMERIZATION OF STABILIZING MONOMERS WITH

The process for preparing the copolymers involves subjecting the monomers, preferably in liquid hydrocarbon or halogenated hydrocarbon solvent such as hexane, benzene, toluene, tetrachloroethylene, to a temperature of −40° to 300° C. and a pressure of 1–300 atmospheres in the presence of a catalyst for a contact time sufficient to form the copolymer, usually at least 20 seconds for a continuous process and at least 3 minutes for a batch process, and then isolating the resulting copolymer.

When high pressures are used, 800 atmospheres and above, a conventional peroxide (di-tertiary-butyl peroxide) or azo catalyst (alpha,alpha'-azobisdicyclohexanecarbonitrile) may be used and the temperature is preferably 25°–175° C.

It is believed that the essential feature of this type of catalyst, or more properly termed "initiator," is that they are capable of generating free radicals. These free radical initiators, whether they be generated from a peroxide compound or from an azo-type compound combine with a polymerizable monomer to form a new free radical, the new free radical combines with another monomer molecule to form still another free radical, this process is repeated until there is propagated a long polymer chain, as is well known in the art. Polymer chain growth terminates when the free radical-bearing polymer fragment encounters another free radical which, for example, may be another growing polymer chain or an initiator free radical.

Typical peroxides which release free radicals to function as initiators include benzoyl peroxide, di-tertiary-butyl peroxide, di-tertiary-butyl peroxydicarbonate, 2,2-bis-(tertiarybutylperoxy) butane, dimethyl dioxide, diethyl dioxide, dipropyl dioxide, propyl ether dioxide and propyl methyl dioxide. Organic hydroperoxides also applicable are, for example, tertiary-butylhydroperoxide, cumene hydroperoxide, ethyl hydroperoxide, and can be used to initiate polymerizations of this kind. Combinations such as ammonium persulfate with a reducing agent can also be used. Typical azo compounds which decompose to liberate free radicals for initiation of polymerization include such catalysts as alpha,alpha'-azobis-dicyclohexanecarbonitrile, alpha,alpha' - azobisisobutyronitrile, triphenylmethylazobenzene, 1,1'-azodicycloheptane-carbonitrile, alpha,alpha'-azobisisobutyramide, lithium azodisulfonates, magnesium azodisulfonate, dimethyl alpha,alpha'-azodiisobutyrate, alpha,alpha'-azobis(alpha, gamma-dimethylvaleronitrile) and alpha,alpha'-azobis(alpha, beta-dimethylbutyronitrile).

"Coordination" catalysts, as defined in U.S. Patent 2,822,357, may also be used to effect copolymerization. Specifically, such "coordination" catalysts are composed of:

(A) A compound containing at least one metal of the group consisting of metals of Groups IVa, Va and VIa of the Periodic Table, iron, cobalt, copper, nickel and maganese, said metal having directly attached thereto at least one substituent from the group consisting of halogen, oxygen hyrocarbon and —O-hydrocarbon;
and
(B) a reducing compound selected from the group consisting of metal hydrides and compounds having a metal of Groups I, II and III of the Periodic Table, said metal being above hydrogen in the electromotive series, attached directly through a single bond to a carbon atom, said carbon atom selected from the group consisting of trigonal carbon and tetrahedral carbon.

In the above definitions, Periodic Table means Mendeleeff's Periodic Table of the Elements, 25th ed., Handbook of Chemistry and Physics, published by the Chemical Rubber Publishing Co. Specific examples of compound (A) included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra(chloroethyl) ziroconate and the like. Specific examples of compound (B) in this definition are phenyl magnesium bromide, lithium aluminum tetraalkyl, aluminum trialkyl, dimethyl cadmium, diphenyl tin and the like.

Copolymerization is preferably carried out in a solvent medium. Among the solvents which have been found useful in the present invention are hydrocarbons and halogenated hydrocarbons: hexane, benzene, toluene, cyclohexane, bromobenzene, chlorobenzene, o-dichlorobenzene, tetrachloro-ethylene, dichloromethane and 1,1,-2,2-tetrachloroethane. Heterocyclic compounds such as tetrahydrofuran, thiophene and dioxane may also be used. In some instances, copolymerization may be effected without a solvent or in an emulsion or slurry system.

The ratio of the light stabilizing monomer to ethylene and/or other monomer reacted therewith should be such that the final copolymer is composed of .01–10 mole percent of the stabilizing compound and 99.99–90 mole percent of the other monomer or monomers. Less than .01 percent of the stabilizer does not provide adequate protection against ultraviolet light. More than 10 percent tends to affect adversely the physical properties of the basically polyethylene or polypropylene, etc., structure. The ultraviolet light stabilizing monomer can be copolymerized with ethylene and the like while the stabilizer is in the form of a polymerizable ethylenically unsaturated compound of the acryloxyacetophenone type. This can then be transformed by conventional rearrangement to the light stabilized copolymer. Alternatively, the ethylenically unsaturated ultraviolet light stabilizing monomer can first be transformed to the polymerizable stabilizer in the acrylylsalicylylmethane form (the rearranged form) and this in turn can be copolymerized to the desired ultraviolet light resistant copolymer. It is generally preferred to copolymerize the unsaturated stabilizer monomer of the acryloxyacetophenone type with the olefin and transform this by rearrangement to the desired light stable copolymer because a higher proportion of the stabilizer can be more readily incorporated in this way. It has been found that this reaction is very efficient so that a reaction mixture of about .01–10 mole percent of the stabilizing monomer and about 99.99–90 mole percent of the remaining monomer or monomers usually will provide the desired polymer product. It is also possible to graft copolymerize the ethylenically unsaturated stabilizer or the stabilizer monomer to the preformed olefin polymer. For this also, the unsaturated stabilizer is preferred.

REARRANGEMENT OF THE ESTERS OF O-HYDROXYACETOPHENONES IN THE POLYMER OR THE MONOMER

The rearrangement of various esters of this type is summarized in Organic Reactions, vol. VIII, John Wiley & Sons, Inc., N.Y., page 90. Various aroyl derivatives of o-hydroxyacetophenones such as benzoyloxyacetophenone and cinnanoyloxyacetophenone as well as the corresponding acyloxyacetonaphthones are known to undergo this rearrangement to the corresponding beta-diketone structure. Various basic reagents such as potassium carbonate, potassium hydroxide, sodium ethoxide, sodium amide, or metallic sodium promote the rearrangement. The rearrangements are usually carried out in an appropriate solvent such as pyridine, benzene, xylene or ether. The rearrangements are effected by heating the reactant at moderately high temperatures, for example, 90–125° C. Very high temperatures or prolonged heating periods are avoided because these conditions can lead to cyclization of the resulting beta-diketone.

The polymer product, in its preferred form (i.e., reaction product of a light stabilizing monomer and ethylene or the like) is a substantially linear polymer having pendant groups of the formula:

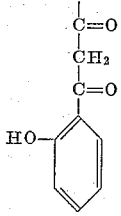

and having an inherent viscosity of 0.3–3.0, preferably 0.5 to 1.5. In the preferred polymer, the linear portion of the polymer is hydrocarbon, i.e., composed solely of carbon and hydrogen.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [1] known to those skilled in the art. The infrared spectra herein were taken on pressed films by the use of a Perkin-Elmer Model 21 Spectrophotometer or a Perkin-Elmer Infracord Spectrophotometer following the known techniques.

Measurements of ultraviolet light absorption were carried out in accordance with procedures described in "Analytical Chemistry" by C. R. N. Strouts, J. H. Gilfillan and H. N. Wilson, volume II, Chapter 22, Oxford University Press, 1955.

The ferric chloride test for the presence of phenols is described by Wesp and Brode, Journal of the American Chemical Society, 56, 1037 (1934).

---

[1] W. M. D. Bryant and R. C. Voter, Journal of American Chemical Society, 75, 6113 (1953). F. W. Billmeyer, "Textbook of Polymer Chemistry," Chapter 7, Interscience Publishers, 1957.

The light stability test used in the examples was carried out by exposing the films to the action of a bank of Westinghouse Sunlamps for the periods indicated.

Inherent viscosity is defined by L. H. Cragg in the Journal of Colloid Science, volume I, pages 261–9 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of alpha-chloronaphthalene at 125° C.

*Example 1*

PREPARATION OF 2-METHACRYLOXYACETOPHENONE

Twenty grams (0.15 mole) of 2-hydroxyacetophenone was stirred dropwise into a solution of 5.9 grams (0.15 mole) of sodium hydroxide in 100 ml. of water at room temperature. When the phenone was dissolved, 15.5 grams (0.15 mole) of methacrylyl chloride was similarly added dropwise with stirring, and the mixture was stirred for an additional 20 minutes. The resulting oil phase was separated, dissolved in ether, dried over anhydrous sodium sulfate, stripped of ether and distilled. The fraction distilling at 100° C.–118° C. at a pressure of 0.3 mm. of mercury was dissolved in 20 ml. of ethanol. To this there was added 30 ml. of water and the solution was cooled to 0° C., whereupon 18.4 grams of light-colored plates crystallized from the solution. This product was further crystallized to a constant melting point of 41° C., the final yield being 12.9 grams.

An infrared scan showed ester and carbonyl absorption in the 1700–1750 cm.$^{-1}$ region. There was no evidence of phenolic hydroxyl group absorption, indicating successful esterification. The chemical analysis was: carbon, 69.92%; hydrogen, 5.47%. When calculated for $$C_{12}H_{12}O_3:$$

carbon should be 70.57%; hydrogen, 5.92%. The product was, therefore, 2-methacryloxyacetophenone.

COPOLYMERIZATION OF 2-METHACRYLOXYACETOPHENONE WITH ETHYLENE

A solution of 112 ml. of benzene, 0.2 gram of azobisdicyclohexanecarbonitrile and 3.0 grams of the 2-methacryloxyacetophenone was heated at 115° C.–120° C. under a pressure of 13,000–13,500 p.s.i. of ethylene for 1.5 hours. The product was separated, washed with copious amounts of ethanol in an Osterizer and dried at 50° C. in a vacuum oven to yield a product weighing 18.2 grams.

A 1.7 mil film was pressed at 125° C. under 15 tons pressure starting with a one-square inch sample of the material. Infrared analysis of the pressed film showed absorption bands at 1650 cm.$^{-1}$ and 1725 cm.$^{-1}$ characteristic of bonded carbonyl and ester groups, respectively. The copolymer contained approximately 2.5 mole percent of methacrylic ester units. Repeated dissolving of the polymeric product in toluene and reprecipitation caused no change in compositions as indicated by infrared absorption, indicating that a ture copolymer of ethylene and 2-methacryloxyacetophenone had been formed.

REARRANGEMENT OF THE COPOLYMER

Ten grams of the copolymer described above was pulverized and then dissolved in 15 ml. of boiling pyridine to which was then added 1.0 gram of powdered potassium hydroxide. The mixture was stirred at 75° C. for 15 minutes after which it was cooled to 25° C. to precipitate the swollen polymer. The polymeric gel was washed successively with a 5% acetic acid solution and hot water in an Osterizer, followed by drying in a vacuum oven at 50° C.

A one-mil film was pressed at 125° C. under 15 tons pressure, as described above. The infrared scan on the film showed strong absorption bands in the range of 1550–1650 cm.$^{-1}$, indicative of bonded carbonyl groups. The film showed strong ultraviolet light absorption over the range of 3000–3700 A. Dissolving the polymer in toluene and reprecipitation did not reduce the ester absorption, confirming again that copolymerization had occurred. The inherent viscosity taken on a solution of 0.1 grams of the polymer in 100 ml. of alpha-chloronaphthalene at 125° C. was 0.60.

The film of the copolymer was flexible after 1600 hours exposure to a bank of Westinghouse F–S ultraviolet sunlamps; a polyethylene control film cracked upon flexing after 150 hours.

The test film showed no evidence of exudation of the stabilizer, whereas another polyethylene control film containing methacrylylsalicylylmethane but not copolymerized with the polyethylene showed evidence of exudation on long-term exposure.

*Example 2*

PREPARATION OF 2-METHACRYLOXYACETOPHENONE

This compound was prepared as in Example 1.

REARRANGEMENT TO METHACRYLYLSALICYLYLMETHANE

A solution was prepared by dissolving 7.8 grams of 2-methacryloxyacetophenone in 50 ml. of boiling pyridine. The solution was treated with 6.0 grams of finely powdered sodium methoxide with vigorous stirring. The stirring was continued for 25 minutes, after which the mixture was cooled to 25° C. and acidified with dilute aqueous acetic acid to liberate a solid. The slurry was filtered, the solid remaining on the filter was washed with water and recrystallized from an 80:20 ethanol:water solution, yielding 5.1 grams of light colored crystals having a melting point of 55° C.–56° C. The ferric chloride test showed the presence of a phenolic group and an infrared scan showed strong absorption at 1650 cm.$^{-1}$, characteristic of bonded carbonyl groups. The compound was, therefore, methacrylylsalicylylmethane.

COPOLYMERIZATION OF METHACRYLYLSALICYLYLMETHANE WITH ETHYLENE

In a 300 ml. shaker tube there was placed 110 ml. of benzene, 2.0 grams of benzoyl peroxide and 0.25 gram of methacrylylsalicylylmethane. Sufficient ethylene was admitted to give an autogenous pressure of 13,000 p.s.i. at 110° C. After a reaction time of approximately one hour and with constant repressuring of ethylene, the excess ethylene was bled off and the product was purified by washing in an Osterizer with copious quantities of methanol.

A one-square inch sample of the copolymer was pressed under 15 tons pressure at 125° C. to form a film. Infrared analysis of the film showed the presence of approximately 0.1 mole percent of the methacrylylsalicylylmethane units. A solution of the copolymer in toluene followed by reprecipitation and subsequently pressing into the form of a film, gave a product which showed no change in the infrared absorption characteristics from the original copolymer showing that a true copolymer had been obtained. The film showed a maxima in ultraviolet absorption at 3000–3700 A. The inherent viscosity taken on a solution of 0.1 gram of the polymer in 100 ml. of alpha-chloronaphthalene at 125° C. was 0.55.

The film of the copolymer was flexible after 1600 hours exposure to a bank of Westinghouse F–S ultraviolet sunlamps; a polyethylene control film cracked upon flexing after 150 hours.

The test film showed no evidence of exudation of the stabilizer, whereas another polyethylene control film containing methacrylylsalicylylmethane but not copolymerized with the polyethylene showed evidence of exudation on long-term exposure.

Example 3

PREPARATION OF 2-ACRYLOXYACETOPHENONE

Following the procedure of Example 1, 20 grams (0.15 mole) of 2-hydroxyacetophenone was added dropwise with stirring to a solution of 5.9 grams (0.15 mole) of sodium hydroxide in 100 ml. of water at room temperature. To the resulting solution, 11.2 grams of acrylyl chloride was added dropwise with stirring over a period of 15 minutes, and the reaction mixture was stirred for an additional 20 minutes. The resulting oil phase was separated and dissolved in ether. The ether solution was washed with water, dried over anhydrous sodium sulfate and then heated on a water bath to evaporate the ether. The residual oil was dissolved in a solution of 20 ml. of ethanol and 30 ml. of water. Upon cooling the solution to 0° C. there was crystallized from the solution 15.5 grams of buff-colored platelets. This product was used for the next step of copolymerization with propylene.

COPOLYMERIZATION OF 2-ACRYLOXYACETOPHENONE WITH PROPYLENE

Vanadyl trichloride, 0.2 ml., and 1 M aluminum triisobutyl, 5 ml., were added to 200 ml. of stirred anhydrous chlorobenzene under nitrogen. To this mixture, there was added simultaneously at 25° C. propylene at the rate of 175 cc./min. and a solution of 2-acryloxyacetophenone (1.5 gram diluted in 20 ml. of chlorobenzene) at the rate of 0.5 ml./min. The reaction product was treated successively with cold 5% hydrochloric acid in methanol, then 50% methanol and then pure methanol. The solvent was evaporated in a vacuum oven at 70° C. to leave 10 grams of copolymer.

A film was prepared by pressing a one-square inch sample of the copolymer at 125 °C. and 15 tons pressure. Infrared analysis of the pressed film showed strong absorption in the 1725 cm.$^{-1}$ region characteristic of ester groups. The copolymer contained 2.3 mole percent of the acrylic ester. Dissolving the polymeric product in toluene and reprecipitating it caused no change in the infrared absorption, indicating that a true copolymer had been formed.

REARRANGEMENT OF THE COPOLYMER

Rearrangement of this copolymer was carried out following the procedure described in Example 1. A one-mil film was pressed at 125° C. and 15 tons pressure. An infrared scan of the film showed a strong absorption band at 1650 cm.$^{-1}$, characteristic of bonded carbonyl groups. The film showed strong ultraviolet light absorption over the range of 3000–3700 A. The infrared and ultraviolet light absorption characteristics of the copolymer were not changed by dissolution in toluene and reprecipitation. The inherent viscosity taken on a solution of 0.1 gram of the polymer in 100 ml. of alpha-chloronaphthalene at 125° C. was 1.2.

A film of the copolymer was flexible after 1500 hours exposure to a bank of Westinghouse F–S ultraviolet sunlamps; a polypropylene control film after 150 hours cracked upon flexing. Another control film containing acrylylsalicylylmethane, not copolymerized with the propylene, became embrittled after 400 hours of exposure to the test lamps.

Example 4

PREPARATION OF 2-METHACRYLYLOXYACETOPHENONE

This compound was prepared as described for Example 1.

COPOLYMERIZATION OF 2-METHACRYLOXYACETOPHENONE WITH BUTENE-1

This copolymerization was carried out in accordance with the procedure described in Example 3. A one-mil film was pressed at 125° C. and 15 tons pressure starting with a one-square inch sample of the copolymeric material. Infrared analysis of the pressed film showed infrared absorption at 1725 cm.$^{-1}$, characteristic of ester groups. The copolymer contained 2.0 mole percent of the methacrylic ester. Repeated dissolving of the polymeric product in toluene and reprecipitation caused no change in composition indicating that a true copolymer had been formed.

REARRANGEMENT OF THE COPOLYMER

This rearrangement was carried out following the procedure described in Example 1. A one-square inch sample of the copolymer was pressed into a one-mil film at 125° C. and 15 tons pressure. An infrared scan showed strong absorption at 1650 cm.$^{-1}$ characteristic of bonded carbonyl groups. The film showed also strong ultraviolet light absorption over the range of 3000–3700 A. The inherent viscosity taken on a solution of 0.1 gram of the polymer in 100 ml. of alpha-chloronaphthalene at 125° C. was 0.78.

A film of the copolymer was flexible after 1500 hours exposure to a bank of Westinghouse F-S ultraviolet sunlamps; a butene-1 control film cracked upon flexing after 140 hours exposure.

The main advantage of the copolymer of this invention is that a high proportion of the light-stabilizing component can be incorporated in a copolymer to give enhanced resistance to degradation from ultraviolet light. It is also clear that by incorporating the light-stabilizing ingredient in the base polymeric structure as part of a copolymer, adverse incompatibility effects are avoided and the light-stabilizing function is essentially permanent. A further advantage is that a separate processing step, such as milling or dissolution, is not required to incorporate the light-stabilizing composition into the base polymer. The copolymer and its light-stabilizing qualities are provided during the one-step copolymerization. Moreover, incorporation of the light stabilizer by copolymerization in this manner can be done in conventional polymerization equipment.

The products of this invention are resistant to degradation by ultraviolet light over a wide range of frequency and for prolonged periods of time. As copolymeric structures, e.g., self-supporting films, supporting films (laminates and coatings), filaments, tubing, etc., they are important for outdoor commercial applications. Thus, these structures will find utility in the preparation of greenhouses, exterior screening, garden hose, garden mulching, as part of automobile exteriors, etc.

As discussed previously, it is also possible to graft copolymerize the polymerizable light-stabilizing monomer on to a prepolymerized ethylenic or other unsaturated compound of the type defined hereinbefore. This would be especially useful where it was desired to confined the light-stabilizing composition to the surface as a coating.

Having fully disclosed the invention, what is claimed is:

1. A substantially linear polymer consisting essentially of the following recurring units:

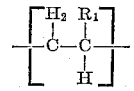

and

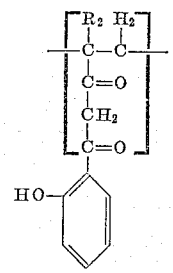

wherein $R_1$ is selected from the group consisting of hydrogen and alkyl having 1–4 carbon atoms and $R_2$ is selected from the group consisting of hydrogen and alkyl having 1–3 carbon atoms, the second-mentioned recurring units being .01–10 mole percent of said polymer, said polymer having an inherent viscosity of 0.3–3.0 as measured using 0.1 gram of the polymer in a solution with 100 milliliters of alpha-chloronaphthalene at 125° C.

2. A substantially linear polymer as in claim 1 wherein $R_1$ is hydrogen.

3. A substantially linear polymer as in claim 1 wherein $R_1$ is methyl.

4. A substntially linear polymer as in claim 1 wherein $R_1$ is ethyl.

5. A substntially linear polymer as in claim 1 wherein $R_2$ is hydrogen.

6. A substantially linear polymer as in claim 1 wherein $R_2$ is methyl.

7. A shaped article of a substantially linear polymer consisting essentially of the following recurring units:

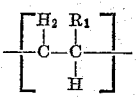

and

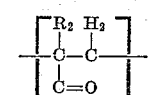

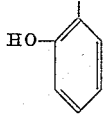

wherein $R_1$ is selected from the group consisting of hydrogen and alkyl having 1–4 carbon atoms and $R_2$ is selected from the group consisting of hydrogen and alkyl having 1–3 carbon atoms, the second-mentioned recurring units being .01–10 mole percent of said polymer, said polymer having an inherent viscosity of 0.3–3.0 as measured using 0.1 gram of the polymer in a solution with 100 milliliters of alpha-chloronaphthalene at 125° C.

8. A film of a substantially linear polymer consisting essentially of the following recurring units:

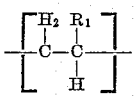

and

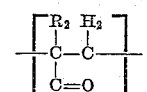

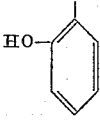

wherein $R_1$ is selected from the group consisting of hydrogen and alkyl having 1–4 carbon atoms and $R_2$ is selected from the group consisting of hydrogen and alkyl having 1–3 carbon atoms,
the second-mentioned recurring units being .01–10 mole percent of said polymer, said polymer having an inherent viscosity of 0.3–3.0 as measured using 0.1 gram of the polymer in a solution with 100 milliliters of alpha-chloronaphthalene at 125° C.

9. A self-supporting film of a substantially linear polymer consisting essentially of the following recurring units:

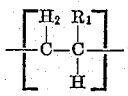

and

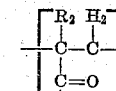

wherein $R_1$ is selected from the group consisting of hydrogen and alkyl having 1–4 carbon atoms and $R_2$ is selected from the group consisting of hydrogen and alkyl having 1–3 carbon atoms, the second-mentioned recurring units being .01–10 mole percent of said polymer, said polymer having an inherent viscosity of 0.3–3.0 as measured using 0.1 gram of the polymer in a solution with 100 milliliters of alpha-chloronaphthalene at 125° C.

10. A filament of a substantially linear polymer consisting essentially of the following recurring units:

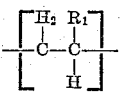

and

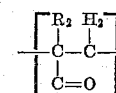

wherein $R_1$ is selected from the group consisting of hydrogen and alkyl having 1–4 carbon atoms and $R_2$ is selected from the group consisting of hydrogen and alkyl having 1–3 carbon atoms, the second-mentioned recurring units being .01–10 mole percent of said polymer, said polymer having an inherent viscosity of 0.3–3.0 as measured using 0.1 gram of the polymer in a solution with 100 milliliters of alpha-chloronaphthalene at 125° C.

11. A process comprising copolymerizing 90–99.99 mole percent of at least one unsaturated aliphatic compound, compound A, having the structural formula:

wherein $R_1$ is selected from the group consisting of hydrogen and alkyl having 1–4 carbon atoms, and .01–10 mole percent of at least one unsaturated compound, compound B, having the structural formula:

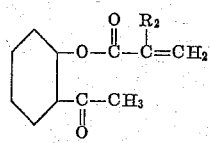

wherein $R_2$ is selected from the group consisting of hydrogen and alkyl having 1–3 carbon atoms to form a copolymer of compound A and compound B; rearranging said copolymer to form a substantially linear polymer having pendant groups of the formula:

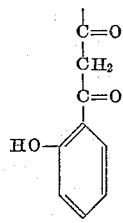

said substantially linear polymer having an inherent viscosity of 0.3–3.0.

12. A process as in claim 11 wherein compound A is ethylene.

13. A process as in claim 11 wherein compound A is propylene.

14. A process as in claim 11 wherein compound A is butene-1.

15. A process as in claim 11 wherein compound B is 2-methacryloxyacetophenone.

16. A process as in claim 11 wherein compound B is 2-acryloxyacetophenone.

17. A process of copolymerizing 90–99.99 mole percent of at least one unsaturated aliphatic compound, compound A, having the structural formula:

wherein $R_1$ is selected from the group consisting of hydrogen and alkyl having 1–4 carbon atoms, and .01–10 mole percent of at least one unsaturated compound, compound B, having the structural formula:

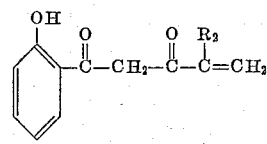

wherein $R_2$ is selected from the group consisting of hydrogen and alkyl having 1–3 carbon atoms to form a substantially linear polymer having pendant groups of the formula:

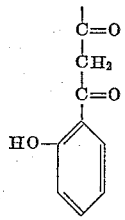

said substantially linear polymer having an inherent viscosity of 0.3–3.0.

References Cited in the file of this patent

UNITED STATES PATENTS 2,938,883    Raich _____ May 31, 1960

OTHER REFERENCES

Gowan et al.: J. Chem. Soc. (1950), pp. 1925–8.
Organic Reactions, vol. VIII, John Wiley & Sons, 1954, pp. 90–91.